(12) United States Patent
Goto

(10) Patent No.: US 11,836,476 B2
(45) Date of Patent: Dec. 5, 2023

(54) ELECTRONIC CONTROL UNIT, SOFTWARE UPDATE METHOD, SOFTWARE UPDATE PROGRAM PRODUCT AND ELECTRONIC CONTROL SYSTEM

(71) Applicant: DENSO CORPORATION, Kariya (JP)

(72) Inventor: Fumihide Goto, Kariya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 17/534,490

(22) Filed: Nov. 24, 2021

(65) Prior Publication Data
US 2022/0171612 A1 Jun. 2, 2022

(30) Foreign Application Priority Data

Nov. 27, 2020 (JP) ................................ 2020-197505
Oct. 29, 2021 (JP) ................................ 2021-178151

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45579* (2013.01); *G06F 2009/45595* (2013.01)

(58) Field of Classification Search
CPC . G06F 2009/45595; G06F 2009/45579; G06F 9/45558; G06F 8/65
See application file for complete search history.

(56) References Cited

U.S. PATENT DOCUMENTS

| 2017/0031703 | A1* | 2/2017 | Piel ............................ G06F 8/66 |
| 2018/0107473 | A1* | 4/2018 | Ahmed ................... G06F 8/654 |
| 2018/0152341 | A1* | 5/2018 | Maeda .............. H04L 12/40169 |
| 2018/0203622 | A1  | 7/2018 | Ishiguro |
| 2019/0268420 | A1* | 8/2019 | Acharya ............. H04L 63/0823 |
| 2019/0354364 | A1* | 11/2019 | Seki ........................... G06F 8/65 |
| 2019/0361736 | A1* | 11/2019 | Poledna ................ G06F 9/4881 |

(Continued)

FOREIGN PATENT DOCUMENTS

GB 2592647 A * 9/2021 ............ B60W 50/00
JP 2017-87773 A 5/2017

(Continued)

OTHER PUBLICATIONS

U.S. Appl. No. 17/534,488, filed Nov. 24, 2021, Fumihide Goto.
(Continued)

*Primary Examiner* — Phillip H Nguyen
(74) *Attorney, Agent, or Firm* — Harness, Dickey & Pierce, P.L.C.

(57) ABSTRACT

An electronic control unit includes: a file acquisition portion that acquires a file to update software; and a storage portion that stores the file. A first virtual machine included in the electronic control unit includes: a determination portion that determines whether a first hypervisor that manages the first virtual machine and a second hypervisor that manages a second virtual machine connected to the first virtual machine are the same; and a transfer portion that transfers the file to the second virtual machine when the determination portion determines that the first hypervisor and the second hypervisor are different from each other.

16 Claims, 10 Drawing Sheets

(56) References Cited

U.S. PATENT DOCUMENTS

2020/0057704 A1* 2/2020 Bujan ............... G06F 8/654

FOREIGN PATENT DOCUMENTS

| JP | 2019-125147 A | 7/2019 |
|----|---------------|--------|
| JP | 2020-173561 A | 10/2020 |

OTHER PUBLICATIONS

U.S. Appl. No. 17/534,491, filed Nov. 24, 2021, Fumihide Goto.
Specification of Update and Configuration Management, AUTOSAR AP-R19-11, Document ID 888, pp. 1-122.
Osaka NDS Embedded Linux Cross Online Forum #11, Jul. 10, 2020, BlackBerry Japan, Kazunori Inami, pp. 1-16.
https://monoist.atmarkit.co.jp/mn/articles/2005/20/news043.html, May 5, 2020, pp. 1-3.

* cited by examiner

FIG. 6

| | SAFETY INTEGRITY B OF THE VIRTUAL MACHINE TO BE UPDATED | | | | | |
|---|---|---|---|---|---|---|
| | | QM | ASIL-A | ASIL-B | ASIL-C | ASIL-D |
| SAFETY INTEGRITY A OF THE FIRST VIRTUAL MACHINE | QM | — | — | — | — | — |
| | ASIL-A | TRANSFER FILE | — | — | — | — |
| | ASIL-B | TRANSFER FILE | TRANSFER FILE | — | — | — |
| | ASIL-C | TRANSFER FILE | TRANSFER FILE | TRANSFER FILE | — | — |
| | ASIL-D | TRANSFER FILE | TRANSFER FILE | TRANSFER FILE | TRANSFER FILE | — |

FIG. 8

| Safety Integrity A of the First Virtual Machine \ Safety Integrity B of the Virtual Machine to be Updated | QM | ASIL-A | ASIL-B | ASIL-C | ASIL-D |
|---|---|---|---|---|---|
| QM | – | TRANSFER FILE | TRANSFER FILE | TRANSFER FILE | TRANSFER FILE |
| ASIL-A | TRANSFER FILE | – | TRANSFER FILE | TRANSFER FILE | TRANSFER FILE |
| ASIL-B | TRANSFER FILE | TRANSFER FILE | – | TRANSFER FILE | TRANSFER FILE |
| ASIL-C | TRANSFER FILE | TRANSFER FILE | TRANSFER FILE | – | TRANSFER FILE |
| ASIL-D | TRANSFER FILE | TRANSFER FILE | TRANSFER FILE | TRANSFER FILE | – |

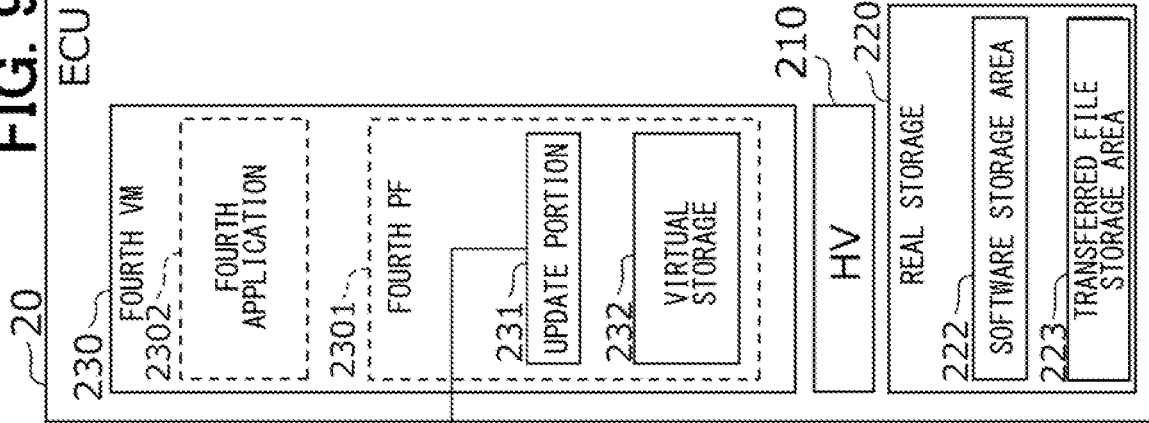
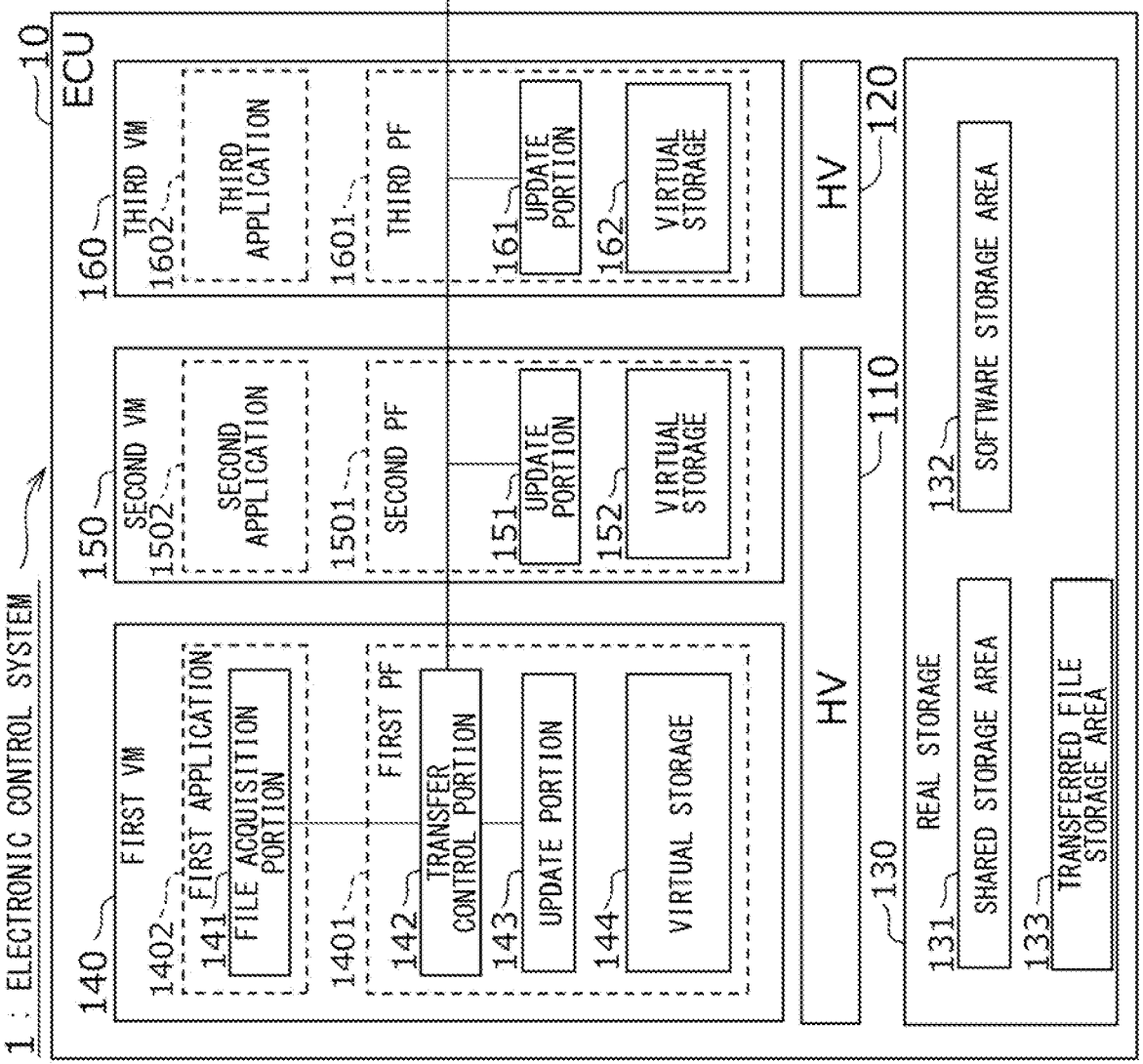

ELECTRONIC CONTROL UNIT, SOFTWARE UPDATE METHOD, SOFTWARE UPDATE PROGRAM PRODUCT AND ELECTRONIC CONTROL SYSTEM

CROSS REFERENCE TO RELATED APPLICATIONS

The present application claims the benefit of priority from Japanese Patent Applications No. 2020-197505 filed on Nov. 27, 2020 and No. 2021-178151 filed on Oct. 29, 2021. The entire disclosures of the above application are incorporated herein by reference.

TECHNICAL FIELD

The present disclosure relates to an electronic control unit, and more specifically, to an electronic control unit for a vehicle, a method performed by the electronic control unit, a program product executable on the electronic control unit, and an electronic control system having the electronic control unit.

BACKGROUND

Various electronic control units connected by an in-vehicle network are mounted in a vehicle. The functions required of automobiles are increasingly complicated with the development of automatic operation technologies in recent years. The number of electronic control units mounted in automobiles is increasing. Therefore, it is proposed to apply a virtualization technology that can suppress the total number of electronic control units by integrating multiple functions into one electronic control unit.

For example, there has been known in an in-vehicle computer, a virtualized operating system such as a hypervisor is used to configure multiple virtual ECUs. Such technology can efficiently use physical resources by integrating the physical resources required for operations of terminal devices into the in-vehicle computer when the terminal devices are connected to the in-vehicle computer via the ECU.

SUMMARY

An electronic control unit according to one aspect of the present disclosure is an electronic control unit including a virtual machine managed by a hypervisor. The electronic control unit includes: a file acquisition portion that is configured to acquire a file to update software; and a storage portion that is configured to store the file. The virtual machine is a first virtual machine includes: a determination portion that is configured to determine whether a first hypervisor that is configured to manage the first virtual machine and a second hypervisor that is configured to manage a second virtual machine connected to the first virtual machine are the same; and a transfer portion that is configured to transfer the file to the second virtual machine when the determination portion determines that the first hypervisor and the second hypervisor are different from each other.

BRIEF DESCRIPTION OF DRAWINGS

FIG. 6 is a diagram illustrating a determination method provided by a determination portion of a first virtual machine according to the second embodiment;

FIG. 8 is a diagram illustrating a determination method provided by the determination portion of the first virtual machine according to a modification of the second embodiment:

FIG. 9 is a diagram illustrating a modification of the electronic control unit according to the first and second embodiments, and the electronic control system including the electronic control unit.

DESCRIPTION OF EMBODIMENTS

Figure 1:
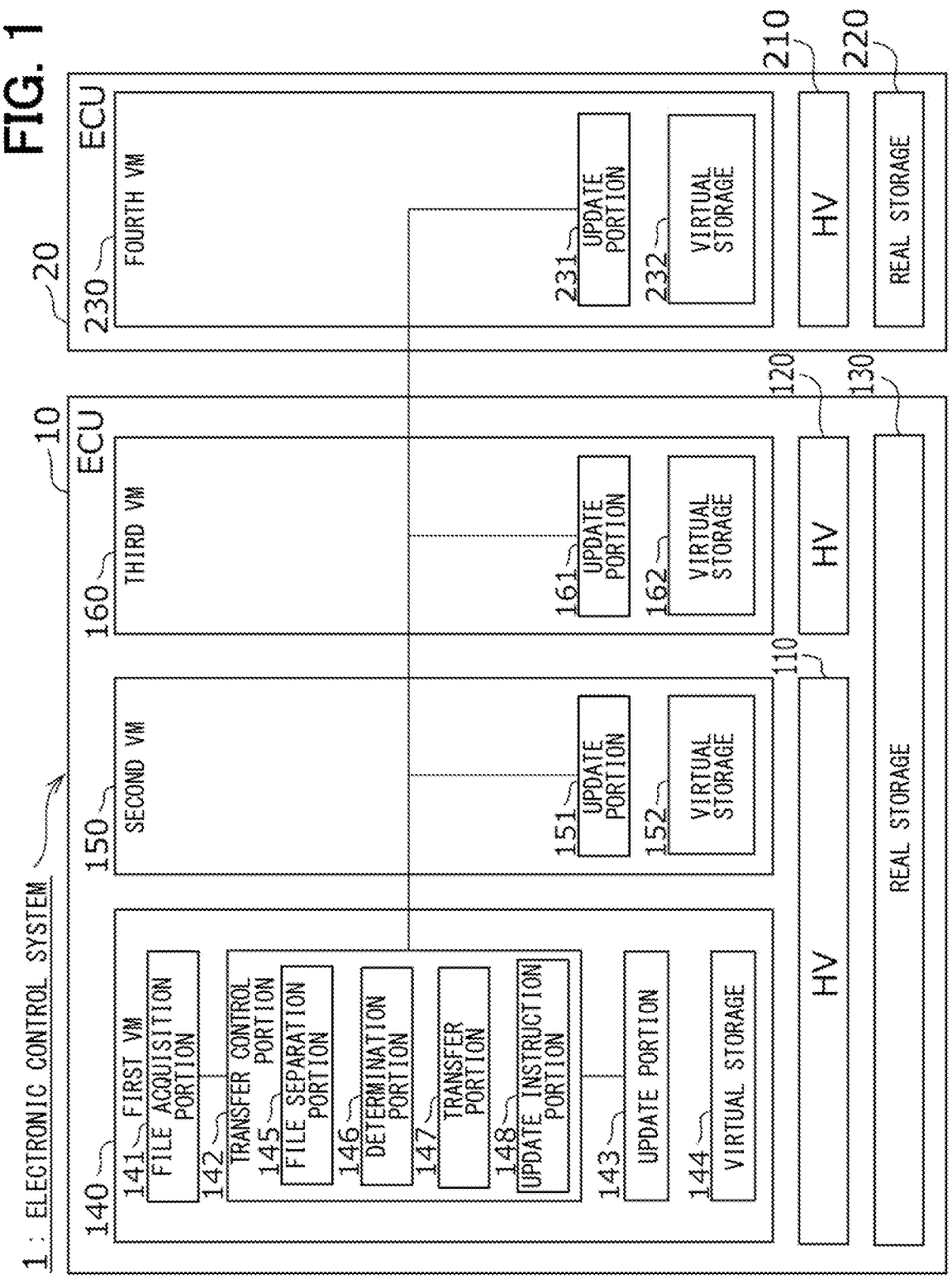
FIG. 1 is a diagram illustrating an electronic control unit according to first and second embodiments, and an electronic control system including the electronic control unit.

To begin with, a relevant technology will be described first only for understanding the following embodiments. The inventors found the following problem.

Some vehicle-mounted electronic control units control vehicle operations such as traveling and steering. The software needs to be updated to the latest version to ensure the safety of the vehicle. However, even if the virtualization technology is used to suppress the number of electronic control units, the electronic control units may be virtualized to cause many virtual machines. In such a case, it may take some time to update all the virtual machines.

It is one objective of the present disclosure to reduce the time required to update the virtual machine software.

As described above, an electronic control unit according to the one aspect of the present disclosure is an electronic control unit including a virtual machine managed by a hypervisor. The electronic control unit includes: a file acquisition portion that is configured to acquire a file to update software; and a storage portion that is configured to store the file. The virtual machine is a first virtual machine includes: a determination portion that is configured to determine whether a first hypervisor that is configured to manage the first virtual machine and a second hypervisor that is configured to manage a second virtual machine connected to the first virtual machine are the same; and a transfer portion that is configured to transfer the file to the second virtual machine when the determination portion determines that the first hypervisor and the second hypervisor are different from each other.

A software update method according to another aspect of the present disclosure is a software update method performed by an electronic control unit including a virtual machine managed by a hypervisor. The method includes: acquiring a file to update software; storing the file in a storage portion; determining whether a first hypervisor that is configured to manage a first virtual machine as the virtual machine and a second hypervisor that is configured to manage a second virtual machine connected to the first virtual machine are the same; and transferring the file to the second virtual machine upon determining that the first hypervisor and the second hypervisor are different from each other.

A software update program product according to yet another aspect of the present disclosure is a software update program executable on an electronic control unit including a virtual machine managed by a hypervisor. The program includes instructions of: acquiring a file to update software; storing the file in a storage portion; determining whether a first hypervisor that is configured to manage a first virtual machine as the virtual machine and a second hypervisor that is configured to manage a second virtual machine connected to the first virtual machine are the same; and transferring the file to the second virtual machine upon determining that the first hypervisor and the second hypervisor are different from each other.

An electronic control system according to yet another aspect of the present disclosure is an electronic control system including: a first electronic control unit having a first virtual machine that is managed by a first hypervisor; and a second electronic control unit having a second virtual machine that is managed by a second hypervisor. The first electronic control unit includes: a file acquisition portion that is configured to acquire a file to update software; and a storage portion that is configured to store the file therein. The first virtual machine includes: a determination portion that is configured to determine whether the first hypervisor and the second hypervisor are the same; and a transfer portion that is configured to transfer the file to the second virtual machine when the determination portion determines that the first hypervisor and the second hypervisor are different from each other. The second virtual machine includes an update portion that is configured to update the second virtual machine by: accessing the storage portion and using the file stored in the storage portion; or using the file transferred by the transfer portion.

The electronic control unit, the software update method, the software update program product, and the electronic control system according to the present disclosure can reduce the time required to update the virtual machine software.

Hereinafter, the description below explains embodiments of the present disclosure by reference to the drawings.

The present disclosure signifies that described in the appended claims or the solution to the problem and is not limited to the following embodiments. At least the quoted words signify those described in the claims or the solution to the problem and are also not limited to the following embodiments.

The configurations and methods described in the dependent claims signify unspecified configurations and methods in the invention described in the independent claims. The configurations and methods of the embodiments corresponding to the configurations and methods described in the dependent claims, and the configurations and methods described only in the embodiments and not described in the claims signify unspecified configurations and methods in the present invention. When the description of a claim is wider than the description of an embodiment, the configurations and methods described in the embodiment also signify unspecified configurations and methods in the present invention in the sense that the configurations and methods described in the embodiments also provide examples of the configurations and methods of the present invention. In any of these cases, a configuration and a method, when described in an independent claim, are indispensable to the present invention.

An effect described in the embodiments applies when the embodiment provides an example of the present invention. The effect is not necessarily intrinsic to the present invention.

When multiple embodiments are available, the configuration disclosed in each embodiment is not limited to that embodiment but can be combined across the embodiments. For example, the configuration disclosed in one embodiment may be combined with another embodiment. Configurations disclosed in the embodiments may be collected and combined.

The problem to be solved in the present invention is not publicly known but is privately acknowledged by the inventors and provides a fact that positively assists in inventive steps of the invention as well as the configurations and methods of the invention.

1. Configurations Common to the Embodiments

The description below explains the electronic control unit according to each embodiment and the electronic control system including the electronic control by reference to FIG. 1. The electronic control unit and the electronic control system according to each embodiment are intended as an in-vehicle device and an in-vehicle system "mounted" in a vehicle as a "moving body," but are not limited thereto.

The "moving body" signifies an object capable of moving and moving speeds are unspecified. Undoubtedly, the moving body may or may not stop. For example, the moving bodies include, but are not limited to automobiles, motorcycles, bicycles, pedestrians, ships, aircraft, and objects mounted on them.

Being "mounted" includes a state of being directly fastened to the moving body and a state of being moved with the moving body though not being directly fastened to the same. For example, the state of being mounted includes a case where a person riding the moving body carries a targeted object or the targeted object is mounted on a cargo placed on the moving body.

An electronic control system 1 includes multiple "electronic control units" (ECUs). As illustrated in FIG. 1, the electronic control system 1 includes two ECUs (ECU 10 and ECU 20) but may include any number of ECUs. The ECU 10 and the ECU 20 are connected via an in-vehicle network such as CAN (Controller Area Network) or LIN (Local Interconnect Network), Ethernet (registered trademark), or a wireless communication network, for example.

For example, the "electronic control unit" is mainly composed of semiconductor devices and may be configured as a so-called information processing device including a CPU (Central Processing Unit) and a volatile storage portion such as RAM (Random Access Memory). The information processing device may further include a non-volatile storage portion such as flash memory and a network interface portion connected to a communication network, for example. Further, the information processing device may be configured as a packaged semiconductor device (element) or a set of semiconductor devices wired on a wiring board.

The ECU 10 is based on a platform called Adaptive Platform (AP) capable of dynamically expanding functions in AUTOSAR (AUTomotive Open System ARchitecture), for example. The AP is mainly suited to ECUs for automatic operations. The ECU 20 is based on a platform called Classic Platform (CP) optimizing static functions in AUTOSAR. The CP is mainly appropriate for vehicle control ECUs.

Each of the ECU 10 and the ECU 20 configuring the electronic control system 1 includes at least one virtual machine managed by a hypervisor. The description below explains the configurations of the ECU 10, the ECU 20, and the virtual machine installed in each ECU. In the drawings, the virtual machine is abbreviated as VM.

(1) ECU 10

The ECU 10 includes a hypervisor (HV) 110, a hypervisor 120, multiple virtual machines (140, 150, and 160) managed by the hypervisors, and a real storage 130 as hardware.

The hypervisor 110 and the hypervisor 120 are software that virtualizes the ECU 10. According to the example in FIG. 1, a first virtual machine 140 and a second virtual machine 150 are built on the hypervisor 110. A third virtual machine 160 is built on the hypervisor 120. The virtual machines built on the hypervisor are virtually "connected" to each other.

The "connection" to virtual machines signifies data exchangeability between the virtual machines. The connection includes not only the virtual connection of virtual machines implemented on the same hardware but also a networked connection between virtual machines implemented on different hardware, for example. The data exchangeability does not necessarily signify the state where data can be practically exchanged. For example, there may be a state of data exchangeability even if one of the virtual machines temporarily stops or enters a sleep state due to some malfunction.

The real storage (comparable to "storage portion") 130 is hardware memory provided as volatile memory such as SRAM and DRAM or non-volatile memory such as ROM, flash memory, or hard disk. Virtual storages for the first virtual machine 140 through the third virtual machine 160 (to be described) are implemented by virtualizing storage areas of the real storage 130. The real storage 130 is a storage area managed by the hypervisor of the ECU 10. FIG. 1 illustrates one real storage 130. However, the real storage 130 may be implemented by multiple storages.

The real storage 130 stores update files separated by a file separation portion 145 to be described later. Update files may be stored in an area of the real storage 130, namely, a shared storage area shared by multiple virtual machines or an area of a virtual storage area provided by virtualizing a storage area of the real storage 130. However, the shared storage area is shared by multiple virtual machines, degrading the security. Therefore, when the update file is stored in the shared storage area, it is favorable to permit access to the shared storage area only when each virtual machine updates software of the virtual machine by using the update file stored in the shared storage area. Namely, access from the virtual machine to the shared storage area is restricted when the update is performed without the use of update files stored in the shared storage area.

(i) First Virtual Machine 140

The first virtual machine 140 managed by the hypervisor 110 includes a file acquisition portion 141, a transfer control portion 142, an update portion 143, and a virtual storage 144.

The file acquisition portion 141 acquires files from a server device provided outside the vehicle control system 1 by using OTA (Over The Air) or wired communication. The files acquired by the file acquisition portion 141 include an update file to update the software for virtual machines. For example, the files may include an update file group containing multiple update files to update multiple virtual machines. The file may also contain information to identify a virtual machine targeted at the software update. The file acquisition portion 141 transfers the acquired update file group to the transfer control portion 142. The file acquisition portion 141 is also referred to as an OTA client. The update files to update the software of the virtual machine may include not only a file to update the software implementing the virtual machine, but also a file to update applications or software installed on the virtual machine.

The transfer control portion 142 performs a series of processes needed to transfer a file transferred from the file acquisition portion 141 to the virtual machine to be updated. The transfer control portion 142 implements a file separation portion 145, a determination portion 146, a transfer portion 147, and an update instruction portion 148. The transfer control portion 142 performs all or part of a function called UCM (Update and Configuration Management) master in AUTOSAR, for example.

The file separation portion 145 performs a parse process that separates an update file group transferred from file acquisition portion 141 into update files corresponding to the virtual machines. The parsed update files are stored in the real storage 130.

The determination portion 146 determines a target virtual machine to be updated out of the multiple virtual machines connected to the first virtual machine 140. Whether the virtual machine is targeted at the update can be determined based on the information that is contained in the file acquired by the file acquisition portion 141 and identifies the virtual machine to be updated. The following embodiment describes a case where all the virtual machines illustrated in FIG. 1 are targeted at the update.

The determination portion 146 also determines whether to transfer the update file to the virtual machine to be updated. The first and second embodiments will later describe the method for determining whether the determination portion 146 transfers the update file to the virtual machine to be updated.

The determination portion 146 may perform a search process to inquire of the virtual machines as to information about the virtual machines when determining the virtual machine to be updated and whether to transfer the update file. For example, the determination portion 146 transmits a search signal to the virtual machine connected to the first virtual machine 140. The search signal inquires the information about the hypervisor managing the virtual machines, the ECU equipped with the virtual machines, or the functions or configuration of the ECU.

When the software update is completed on all the virtual machines to be updated, the determination portion 146 notifies the file acquisition portion 141 that the update completed.

When the determination portion 146 determines the transfer of the update file, the transfer portion 147 transfers the update file separated by the file separation portion 145 to the virtual machine by transmitting the update file via a communication network. The transfer portion 147 may transfer the update file to the virtual machine in response to a transfer instruction from the determination portion 146. According to the present disclosure, "transferring" an update file signifies not only transmitting the update file via the communication network but also moving the storage area for the update file to an area accessible to a specific virtual machine.

The update instruction portion 148 instructs each virtual machine targeted at the update to update the software of the virtual machine. When the determination portion 146 determines to transfer the update file to a virtual machine, the update instruction portion 148 instructs the virtual machine to update the software by using the update file transferred by the transfer portion 147. When the determination portion 146 determines not to transfer the update file to a virtual machine, the update instruction portion 148 accesses the real storage 130 and instructs the virtual machine to update the software by using the update file stored in the real storage 130.

The update instruction portion 148 may provide an update instruction that indicates the address of a storage destination of the update file. For example, when the update instruction indicates the address where the update file is stored, it is possible to indirectly instruct the virtual machine to update the software by using the update file. When the update instruction indicates the address of the real storage 130 where the update file is stored, it is possible to indirectly instruct the virtual machine to update the software by accessing the real storage 130 and using the update file stored in the real storage 130. The update instruction may also contain information indicating whether to transfer the update file to the virtual machine.

The update portion 143 updates the software of the first virtual machine 140 based on the instruction from the update instruction portion 148. When the software update process on the first virtual machine 140 is complete, the update portion 143 notifies the transfer control portion 142 that the update is complete. For example, the update portion 143 and update portions 151, 161, and 231 (to be described) of the other virtual machines perform all or part of the functions referred to as UCM subordinates in AUTOSAR.

The virtual storage 144 is a storage area virtually provided for the first virtual machine 140 by virtualizing a storage area of the real storage 130. Therefore, a file saved in the virtual storage 144 is also considered a file stored in the real storage 130. The same applies to the virtual storage 152 of the second virtual machine 150 and the virtual storage 162 of the third virtual machine 160 described below.

(ii) Second Virtual Machine 150 and Third Virtual Machine 160

Similar to the first virtual machine 140, the second virtual machine 150 is managed by the hypervisor 110. The second virtual machine 150 includes an update portion 151 and a virtual storage 152.

Unlike the first virtual machine 140 and the second virtual machine 150, the third virtual machine 160 is managed by the hypervisor 120. The third virtual machine 160 includes an update portion 161 and the virtual storage 162.

The update portion 151 and the update portion 161 update the software of each virtual machine based on an update instruction from the update instruction portion 148 of the first virtual machine 140. When the software update process is complete, the update portion 151 and the update portion 161 notify the transfer control portion 142 of the first virtual machine 140 that the update is complete.

The virtual storage 152 and the virtual storage 162 are storage areas virtually provided for the second virtual machine 150 and the third virtual machine 160, respectively. When the transfer portion 147 of the first virtual machine 140 transfers the update file, the update file is stored in the virtual storages 152 and 162.

As above, the second virtual machine 150 and the third virtual machine 160 are virtually connected to the first virtual machine 140. Data can be exchanged among these virtual machines.

(2) ECU 20

The ECU 20 includes a hypervisor 210, a real storage 220 as hardware, and a fourth virtual machine 230 managed by the hypervisor 210.

The ECU 10 and the ECU 20 are connected by an in-vehicle network. The first virtual machine 140 included in the ECU 10 and the fourth virtual machine 230 included in the ECU 20 are virtually connected via the in-vehicle network.

The hypervisor 210 is software to virtualize the ECU 20. The fourth virtual machine 230 is built on the hypervisor 210.

Similar to the real storage 130 of the ECU 10, the real storage 220 is hardware memory provided as volatile memory such as SRAM and DRAM or non-volatile memory such as ROM, flash memory, or hard disk.

Similar to the second virtual machine 150 and the third virtual machine 160 described above, the fourth virtual machine 230 in the ECU 20 includes an update portion 231 and a virtual storage 232.

The update portion 231 updates the software of the fourth virtual machine 230 based on the update instruction from the update instruction portion 148 of the first virtual machine 140. When the software update process is complete, the update portion 231 notifies the transfer control portion 142 of the first virtual machine 140 that the update is complete.

The virtual storage 232 is a storage area virtually provided in the real storage 220. When the update file is transferred from the transfer portion 147, the update file may be stored in the virtual storage 232.

(3) Interim Overview

There have been described the configurations of the electronic control unit and the electronic system common to the first and second embodiments.

According to the example of FIG. 1, the ECU 10 includes two hypervisors (110 and 120) and the ECU 20 includes one hypervisor (210). However, the number of hypervisors is just an example and is not limited thereto. The ECU 10 may include only one hypervisor and the ECU 20 may include two or more hypervisors. The number of virtual machines built on the hypervisor is also unspecified.

There has been described the configuration where only the first virtual machine 140 includes the functions of the file acquisition portion and the transfer control portion. However, similar to the first virtual machine 10, the other virtual machines may include these functions.

2. First Embodiment

The present embodiment describes the configuration that determines whether to transfer an update file to a virtual machine to be updated, depending on whether the hypervisor of the virtual machine to be updated satisfies certain conditions.

(1) Configuration of the First Virtual Machine 140

The determination portion 146 according to the present embodiment determines whether the hypervisor (comparable to "first hypervisor") 110 managing the first virtual machine 140 (comparable to "first virtual machine") including the transfer control portion 142 and a hypervisor (comparable to "second hypervisor") managing the virtual machine to be updated (comparable to "second virtual machine") are the same. If the hypervisors are determined to be the same, the determination portion 146 determines not to transfer the update file to the virtual machine to be updated. If the hypervisors are determined to be different, the determination portion 146 determines to transfer the update file to the virtual machine to be updated.

"The same" signifies not only the common hypervisor but also the same functions or operations even if the hypervisors are separate.

The determination portion 146 determines whether the hypervisor 110 and the hypervisor managing the virtual machine to be updated are the same, based on response signals from the virtual machines in response to the search signal transmitted to the update portions of the virtual machines. Therefore, the response signal according to the present embodiment contains, for example, the identification ID of the hypervisor, namely, the information capable of identifying the hypervisor that manages each virtual machine.

The determination portion 146 may transmit a search signal to the update portion 143 of the first virtual machine 140 similar to the update portions of the other virtual machines. In this case, the determination portion 146 determines that the hypervisor 110 is the same as the hypervisor managing the first virtual machine 140 as a virtual machine to be updated based on the response signal from the update portion 143.

According to the example of FIG. 1, the same hypervisor 110 manages the first virtual machine 140 and the second virtual machine 150. Therefore, the determination portion 146 determines not to transfer the update file to the second virtual machine 150.

The hypervisor 110 managing the first virtual machine 140 differs from the hypervisor 120 managing the third virtual machine 160. Then, the determination portion 146 determines to transfer the update file to the third virtual machine 160.

Similarly, the hypervisor 110 managing the first virtual machine 140 differs from the hypervisor 210 managing the fourth virtual machine 230. Then, the determination portion 146 determines to transfer the update file to the third virtual machine 230.

The following embodiments describe the configuration where the determination portion 146 determines whether the hypervisor 110 is the same as the hypervisor managing virtual machines to be updated, based on the response signal. However, the determination portion 146 may determine the hypervisors regardless of the response signal. For example, when the in-vehicle system previously recognizes which hypervisor manages which virtual machine, the file acquisition portion 141 and the transfer control portion 142 are assumed to previously maintain the information about the virtual machines and the hypervisors managing the virtual machines. In this case, the determination portion 146 may determine whether the hypervisor 110 is the same as the hypervisor managing the virtual machine to be updated, based on the instruction from the file acquisition portion 141 or the information maintained in the transfer control portion 142, without using the response signal.

The present embodiment describes the case where the two hypervisors (110 and 120) of the ECU 10 are different. However, when the hypervisors 110 and 120 are provided for one host OS, the determination portion 146 may determine that the hypervisors 110 and 120 are the same. When multiple hypervisors are installed on one host OS, a guest OS built on each hypervisor can access the same area in the real storage 130. In this case, the hypervisors 110 and 120 have the same functions or operations in that both build the guest OS capable of accessing the same area. When the functions or actions of the hypervisors 110 and 120 are the same, the determination portion 146 may determine that the two hypervisors are "the same".

The transfer portion 147 transfers the update file only to a virtual machine to which the determination portion 146 determines to transfer the update file when the hypervisor 110 differs from a hypervisor managing the virtual machine to be updated. Therefore, the transfer portion 147 according to the present embodiment transfers the update file to the third virtual machine 160 and the fourth virtual machine 230.

The update instruction portion 148 instructs the update portion of the virtual machine targeted at the update to update the software of the virtual machine. Then, the update instruction portion 148 instructs the update portion 143 of the first virtual machine 140 and the update portion 151 of the second virtual machine 150 to update the software of the second virtual machine 150 by accessing the real storage 130 and using the update file stored in the real storage 130.

The update instruction portion 148 instructs the update portion 161 of the third virtual machine 160 and the update portion 231 of the fourth virtual machine 230 to update the software of the respective virtual machines by using the update file transferred by the transfer portion 147.

(2) Configuration of the Second Virtual Machine 150

When receiving an update instruction from the update instruction portion 148, the update portion 151 of the second virtual machine 150 accesses the real storage 130, references the update file stored in the real storage 130, and updates the software for the second virtual machine 150 by using the update file.

(3) Configuration of the Third Virtual Machine 160

The virtual storage 162 of the third virtual machine 160 stores the update file transferred from the transfer portion 147.

When receiving an update instruction from the update instruction portion 148, the update portion 161 of the third virtual machine 160 updates the software for the third virtual machine 160 by using the update file stored in the virtual storage 162.

(4) Configuration of the Fourth Virtual Machine 230

The real storage 220 or the virtual storage 232 of the fourth virtual machine 230 stores the update file transferred from the transfer portion 147. The update file may be stored in the real storage 220 or the virtual storage 232.

When receiving an update instruction from the update instruction portion 148, the update portion 231 of the fourth virtual machine 230 updates the software for the fourth virtual machine 230 by using the update file stored in the real storage 220 or the virtual storage 232.

(5) Operations of the Electronic Control System 1

Figure 2:
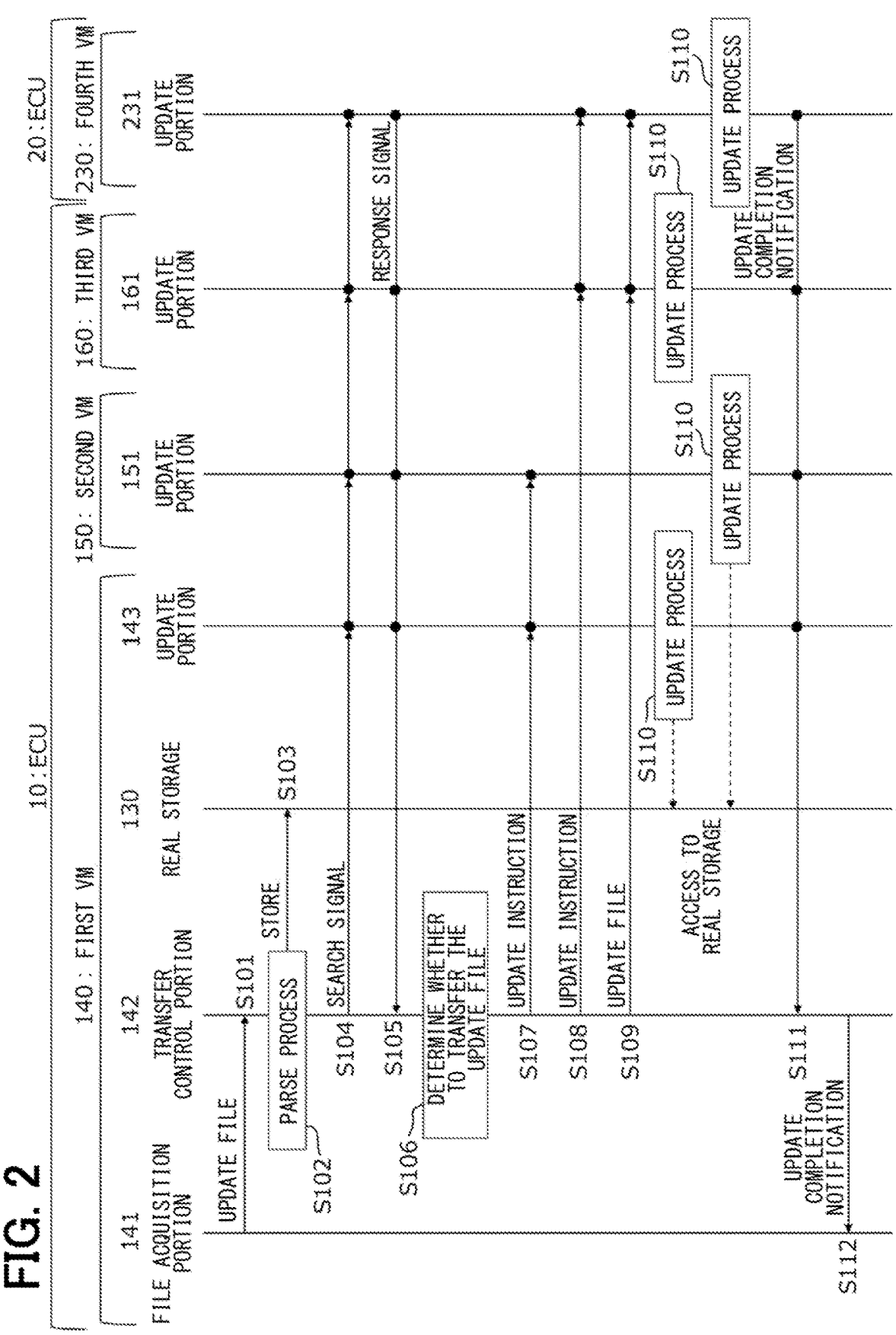
FIG. 2 is a diagram illustrating operations of the electronic control system as a whole according to the first embodiment.
Figure 3:
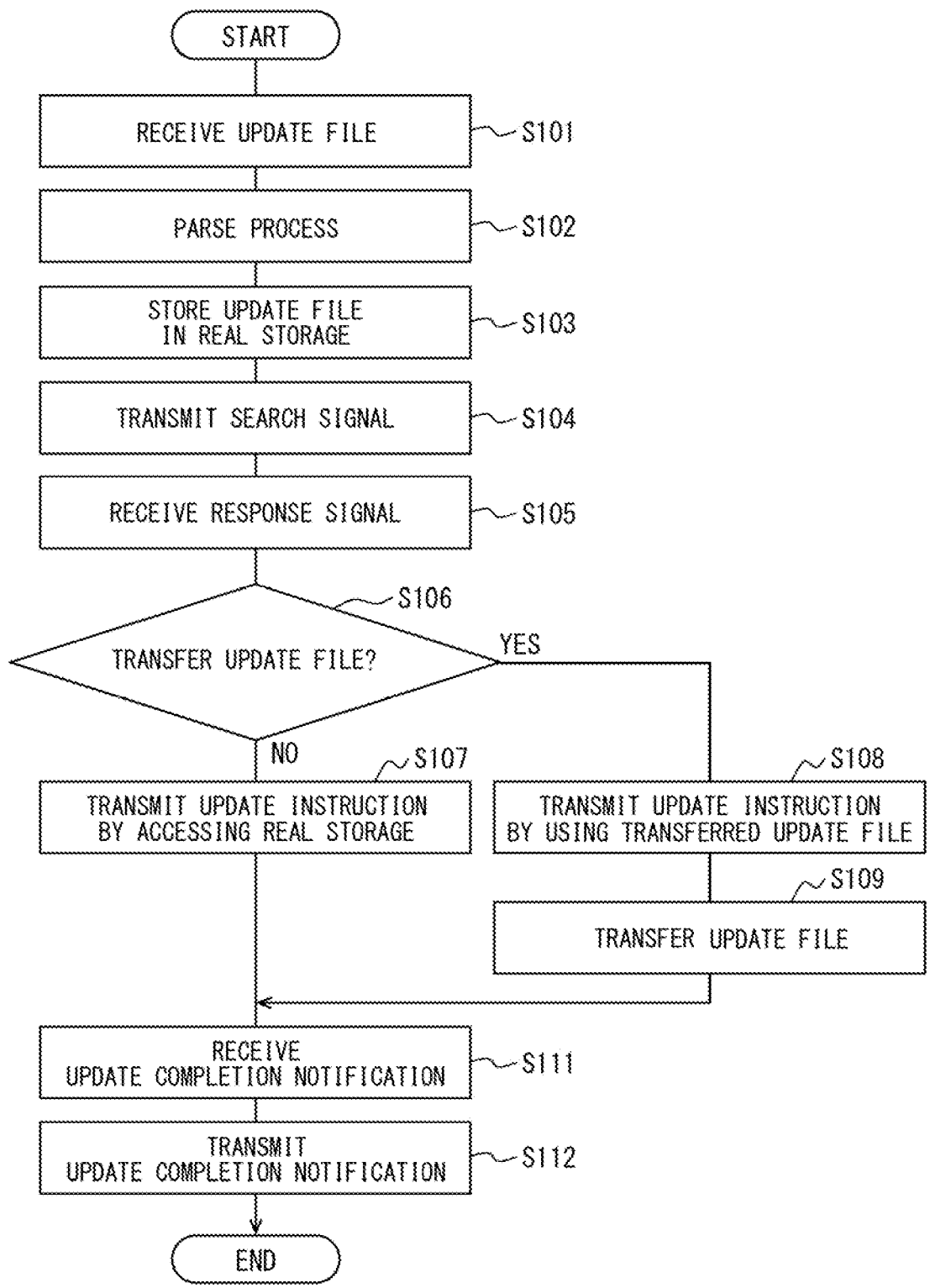
FIG. 3 is a diagram illustrating operations of a transfer control portion according to the first and second embodiments.
Figure 4:
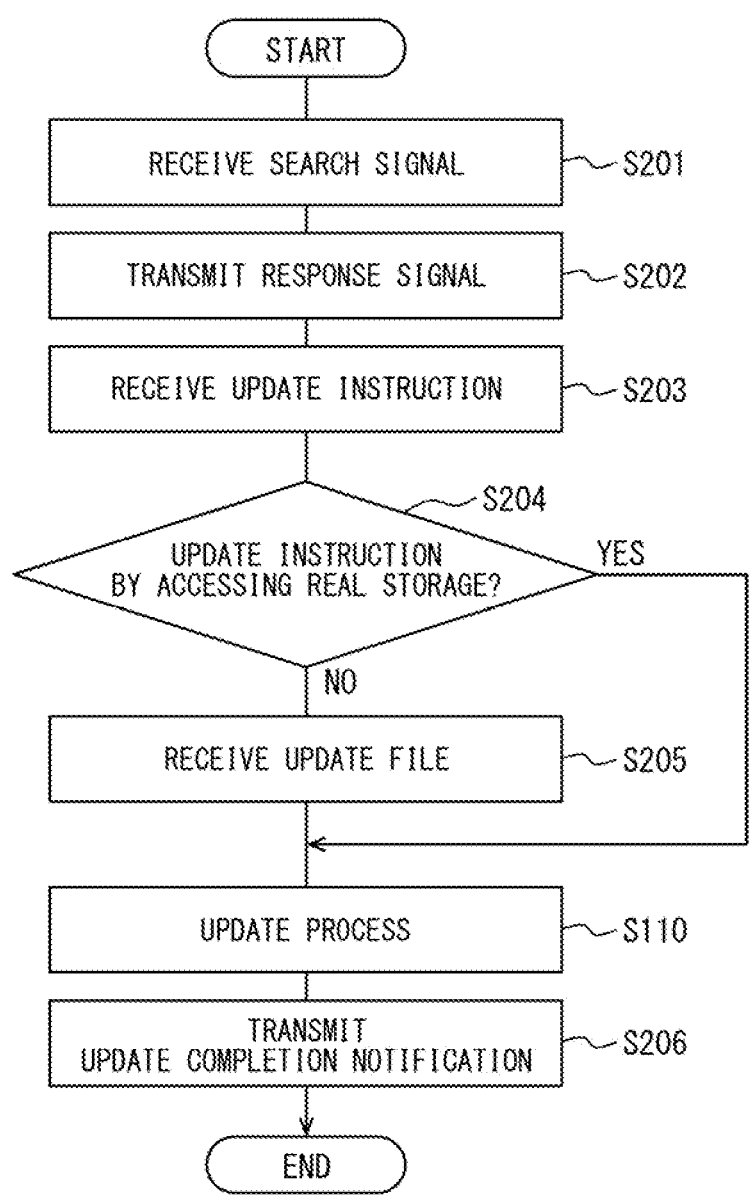
FIG. 4 is a diagram illustrating operations of an update portion according to the first and second embodiments.

The description below explains operations related to the software update for virtual machines by using FIGS. 2 through 4. FIG. 2 is a diagram illustrating operations of the electronic control system 1 as a whole. FIG. 3 illustrates operations of the transfer control portion 142 of the first virtual machine 140. FIG. 4 illustrates operations of the update portion included in each virtual machine. The reference numerals used in FIG. 2 correspond to those used in FIGS. 3 and 4. The same reference numeral represents the same process.

The operations of the transfer control portion 142 and the update portion illustrated in FIGS. 3 and 4 are also considered the operations of the electronic control units (ECU 10 and ECU 20). The operations of each electronic control unit represent not only the software update method performed by the electronic control unit, but also a processing procedure of the software update program executable on the electronic control unit. The processes are not limited to the sequences illustrated in FIGS. 2 through 4. Namely, the sequences may be changed as long as there does not exist a restriction that forces a certain step to use the result of the preceding step, for example. The same applies to FIG. 7 of the second embodiment.

The description below mainly explains operations of the transfer control portion 142 by using FIGS. 2 and 3.

The transfer control portion 142 receives an update file group transferred from the file acquisition portion 141 (FIGS. 2 and 3: S101). The update file group is a file that is used to update the software of the virtual machines and is acquired by the file acquisition portion 141 from a server device outside the electronic control system 1.

The file separation portion 145 of the transfer control portion 142 performs a parse process that separates the update file group received at S101 into update files for the virtual machines (FIGS. 2 and 3: S102).

The file separation portion 145 stores the update files separated at S102 in the real storage 130 (FIGS. 2 and 3: S103).

The determination portion 146 of the transfer control portion 142 transmits a search signal to each virtual machine, inquiring the information about the virtual machine to determine whether to transfer the update file to the virtual machine to be updated (FIGS. 2 and 3: S104).

The determination portion 146 receives the response signals transmitted from the update portions (143, 151, 161, and 231) of the first to fourth virtual machines (FIGS. 2 and 3: S105).

The determination portion 146 determines whether to transfer the update file to the virtual machine to be updated based on the response signal received at S105 (FIGS. 2 and 3: S106). As above, the determination portion 146 according to the present embodiment determines not to transfer the update file if the hypervisor 110 managing the first virtual machine 140 is the same as the hypervisor managing the virtual machine to be updated. The determination portion 146 determines to transfer the update file if the hypervisors are different.

If it is determined not to transfer the update file at S106, the update instruction portion 148 of the transfer control portion 142 accesses the real storage 130 and thereby transmits an update instruction to update the software of the virtual machine (FIGS. 2 and 3: S107).

If it is determined to transfer the update file at S106, the update instruction portion 148 of the transfer control portion 142 transmits an update instruction to update the software of the virtual machine by using the update file transferred by the transfer portion 147 (FIGS. 2 and 3: S108).

The transfer portion 147 of the transfer control portion 142 transfers the update file to the virtual machine that is determined at S106 to transfer the update file. Namely, the update file is transferred to the virtual machine for which the first hypervisor is determined to be the same as the hypervisor managing the virtual machine to be updated (FIGS. 2 and 3: S109). The transfer portion 147 according to the present embodiment transfers the update file to the third virtual machine 160 and the fourth virtual machine 230.

The update portion of each virtual machine performs the update process (S110). The update process in the update portion will be described later.

The transfer control portion 142 receives an update completion notification, indicating completion of the update process, from the update portion of each virtual machine that has completed the update process at S110 (FIGS. 2 and 3: S111).

The transfer control portion 142 receives the notification about the completion of the update process from the update portion of each virtual machine and then notifies the file acquisition portion 141 that the update process for each virtual machine is complete (FIGS. 2 and 3: S112).

The description below mainly explains operations of the update portion of each virtual machine by using FIGS. 2 and 4.

The update portions (143, 151, 161, and 231) of the first to fourth virtual machines receive the search signal transmitted from the determination portion 146 at S104 (S201).

Each update portion transmits a response signal in response to the inquiry of the search signal to the determination portion 146 (S202).

The update portion then receives the update instruction transmitted from the update instruction portion 148 at S107 and S108 (S203). There may be a case where the update instruction received at S203 is caused by access to the real storage (S204: Yes). Namely, the update instruction may be transmitted from the update instruction portion 148 at S107. In this case, the update file stored in the real storage 130 is used to update the virtual machine (S110). According to the example of the present embodiment, the update portion 143 of the first virtual machine 140 and the update portion 151 of the second virtual machine 150 receive the update instruction at S107. Therefore, the update portion 143 and the update portion 151 access the real storage 130 and thereby use the update file stored in the real storage 130 to update the first virtual machine 140 and the second virtual machine 150, respectively (S110).

There may be a case where the update instruction received at S203 is not caused by access to the real storage (S204: No). Namely, the update instruction may be transmitted from the update instruction portion 148 at S108. Then, the update portion receives the update file transferred at S109 (S205). According to the example of the present embodiment, the update portion 161 of the third virtual machine 160 and the update portion 231 of the fourth virtual machine 230 receive the update instruction at S108 and receive the update file transferred at S109 (S205). The update portion 161 and the update portion 231 use the update file received at S205 to update the software of the virtual machine (S110).

When the update process at S110 is complete, the update portion of each virtual machine transmits an update completion notification, indicating the completion of the update, to the transfer control portion 142 (S206).

(6) Interim Overview

According to the above configuration, the virtual machine that controls the transfer of the update file to update the software of virtual machines transfers the update file only to the virtual machine managed by a hypervisor different from the hypervisor managing the virtual machine and does not transfer the update file to the virtual machines managed by the same hypervisor. This makes it possible to omit the process of transferring the update files to some virtual machines. It is possible to reduce loads on the transfer process and shorten the time required to update the software of the virtual machines.

Furthermore, the omission of the process of transferring the update files to some virtual machines can suppress the amount of communication between ECUs, making it possible to reduce loads and congestion on a communication line.

(7) First Modification of the First Embodiment

FIG. 1 illustrates the configuration in which the ECU 10 includes two hypervisors (hypervisor 110 and hypervisor 120). For example, suppose a dual processor that allows an ECU to include multiple microprocessors. A possible configuration allows one ECU to include multiple hypervisors.

However, each ECU configuring the electronic control system 1 may be a single processor and include only one hypervisor. In this case, each ECU configuring the electronic control system 1 cannot include multiple hypervisors. Then, the determination portion 146 may determine whether the ECU including a virtual machine including the transfer control portion 142 is the same as the ECU including a virtual machine to be updated. The determination portion 146 may thereby determine whether the hypervisor 110 managing the first virtual machine 140 is the same as the hypervisor managing each virtual machine.

For example, the determination portion 146 transmits a search signal, inquiring the device ID of the ECU installed with the virtual machine, to each virtual machine. Based on the response signal from each virtual machine, the determination portion 146 determines whether the ECU 10 including the first virtual machine 140 is the same as the ECU including the virtual machine to be updated. When the ECUs are determined to be the same, the determination portion 146 determines that the hypervisor 110 managing the first virtual machine 140 is the same as the hypervisor targeted at the update.

According to the present modification, the determination on the ECU can determine whether the hypervisor managing the virtual machine to control the transfer of the update file is the same as the hypervisor managing the virtual machine to be updated. It is possible to easily determine whether to transfer the update file to the virtual machine to be updated.

(8) Second Modification of the First Embodiment

The above-described embodiment assumes that the hypervisor 110 included in the ECU 10 differs from the hypervisor 210 included in the ECU 20. However, a shared hypervisor may manage virtual machines across ECUs.

According to the second modification, the hypervisor 110 included in the ECU 10 is the same as the hypervisor 210 included in the ECU 20. The same hypervisor manages the first virtual machine 140 and the fourth virtual machine 230. The hypervisor 110 managing the first virtual machine 140 is the same as the hypervisor 210 managing the fourth virtual machine 230. Therefore, the determination portion 146 according to the second modification determines not to transfer the update file to the fourth virtual machine 230.

The update file is not transferred to the fourth virtual machine 230. Therefore, the update portion 231 of the fourth virtual machine 230 accesses the real storage 130 of the ECU 10 and uses the update file stored in the real storage 130 to update the software of the fourth virtual machine 230.

3. Second Embodiment

The present embodiment mainly describes differences from the first embodiment concerning a configuration to determine whether to transfer the update file, based on safety integrity indicating the safety of a virtual machine to control the transfer of the update file and safety integrity indicating the safety of the virtual machine to be updated.

(1) Configuration of the ECU 10

Figure 5:
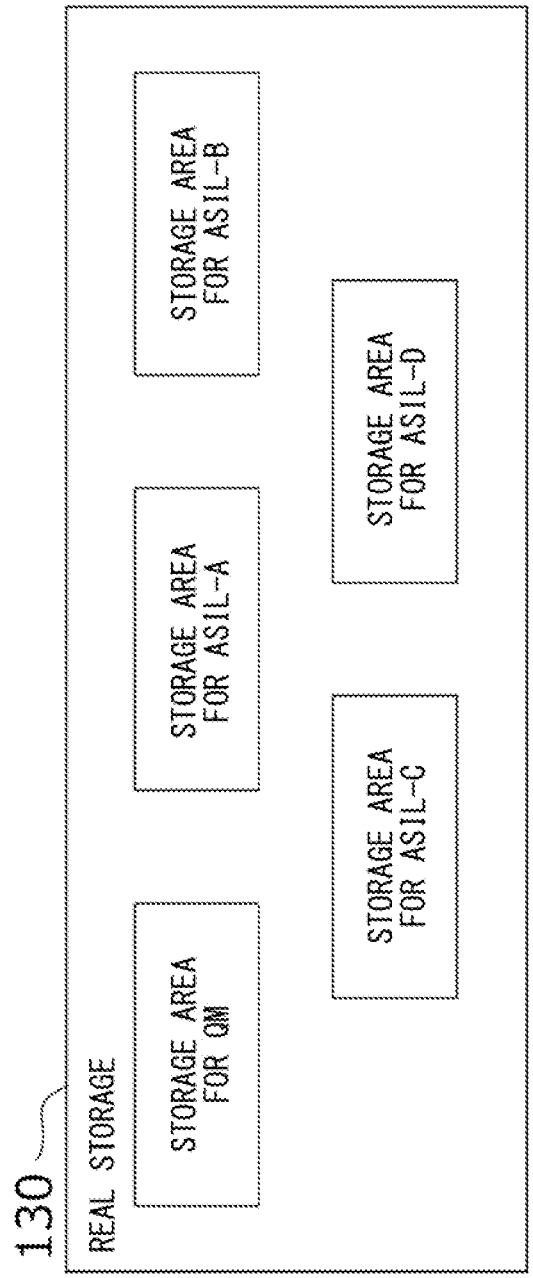
FIG. 5 is a diagram illustrating storage areas in a real storage according to the second embodiment.

FIG. 5 is a diagram illustrating the real storage 130 of the ECU 10 according to the present embodiment. The real storage 130 according to the present embodiment includes storage areas corresponding to five safety integrities.

The safety integrities according to the present embodiment are specified based on Automotive Safety Integrity Level (ASIL), for example. ASIL provides indexes that are defined by the ISO26262 standard and are classified according to the functional safety of vehicles. ASIL includes ASIL-A, ASIL-B, ASIL-C, and ASIL-D stages in ascending order of the safety integrity levels from the lowest. Furthermore, the quality control called QM (Quality Management) is applied when specific functional safety need not be applied. QM provides a safety integrity level lower than ASIL-A. ASIL and QM are assigned to hardware and software.

According to the example in FIG. 5, the real storage 130 includes storage areas for QM, ASIL-A, ASIL-B, ASIL-C, and ASIL-D. The storage area in the real storage 130 used by the virtual machine included in the ECU 10 corresponds to the safety integrity of the virtual machine itself or that of the configuration given to the virtual machine. For example, when the virtual machine is assigned the safety integrity of ASIL-A, the virtual machine uses the storage area for ASIL-A in the real storage 130 as illustrated in FIG. 5. Even if the safety integrity of the virtual machine is ASIL-A, the virtual machine may include a highly independent configuration assigned ASIL-B. Then, the configuration may use the storage area for ASIL-B.

Each virtual machine or the configuration given to the virtual machine cannot access a storage area of the real storage 130 when the storage area is assigned the safety integrity higher than that of the virtual machine or the configuration thereof. For example, the virtual machine assigned the safety integrity of ASIL-B cannot access the storage areas for ASIL-C and ASIL-D.

The following embodiment describes a configuration of determining whether to transfer the update file through the use of the safety integrity indicating the safety of the virtual machine. The safety integrity indicating the safety of a virtual machine may represent the safety integrity assigned to the virtual machine or the safety integrity assigned to a specific configuration given to the virtual machine. For example, the safety integrity assigned to the transfer control portion 142 of the first virtual machine 140 may be used as the safety integrity for the first virtual machine 140. The safety integrity assigned to the update portion 151 of the second virtual machine 150 may be used as the safety integrity for the second virtual machine 150.

As another example, the safety integrity of the virtual machine may represent a value equal to the lowest one of safety integrities assigned to the configurations given to the virtual machine. In this case, the safety integrity of ASIL-C is assigned to the file acquisition portion 141, the transfer control portion 142, and the virtual storage 144 in the first virtual machine 140. When the safety integrity of ASIL-B is assigned to the update portion 143, the first virtual machine 140 is associated with the safety integrity of ASIL-B.

Hereinafter, the present embodiment will be described on the assumption that the first virtual machine 140 is assigned the safety integrity of ASIL-B, the second virtual machine 150 is assigned the safety integrity of ASIL-A, the third virtual machine is assigned the safety integrity of ASIL-C, and the fourth virtual machine is assigned the safety integrity of QM.

(2) Configuration of the First Virtual Machine 140

The determination portion 146 according to the present embodiment transmits a search signal, inquiring the safety integrity of each virtual machine, to each virtual machine. Then, the determination portion 146 receives a response signal, indicating the safety integrity of each virtual machine, from each virtual machine.

The determination portion 146 determines whether to transfer the update file to the virtual machine to be updated, based on safety integrity A (comparable to "first safety integrity") indicating the safety of the first virtual machine 140 including the transfer control portion 142 and safety integrity B (comparable to "second safety integrity") indicating the safety of the virtual machine to be updated.

FIG. 6 illustrates how the determination portion 146 determines whether to transfer the update file, based on safety integrity A of the first virtual machine 140 and safety integrity B of the virtual machine to be updated, FIG. 6 illustrates an example of determining whether to transfer the update file, based on safety integrity A of the virtual machine itself and safety integrity B. As above, however, safety integrity A is assigned to the transfer control portion 142 of the first virtual machine 140. Safety integrity B may be assigned to the update portion of the virtual machine to be updated.

FIG. 6 illustrates that the determination portion 146 determines to transfer the update file to the virtual machine to be updated when safety integrity A of the first virtual machine 140 is higher "than" safety integrity B of the virtual machine to be updated. As above, when safety integrity A of the first virtual machine is higher than safety integrity B of the virtual machine to be updated, the update portion of the virtual machine to be updated cannot access the storage area of the real storage 130 used by the first virtual machine 140. Then, the determination portion 146 determines to transfer the update file when the update portion of the virtual machine to be updated cannot access the storage area of the real storage 130 used by the first virtual machine 140.

Being higher or lower "than" something also signifies being higher or lower "than" or equal to something The table in FIG. 6 illustrates an example of determining to transfer an update file only when the storage area of the real storage 130 used by the first virtual machine 140 is inaccessible. However, the update file may be transferred even when safety integrity A is equal to safety integrity B.

The determination portion 146 can identify the safety integrity of the virtual machine to be updated based on the response signal from each virtual machine in response to the search signal transmitted to the update portion of each virtual machine. Therefore, the response signal according to the present embodiment contains the information indicating the safety integrity of each virtual machine.

The determination portion 146 may transmit a search signal to the update portion 143 of the first virtual machine 140 similarly to the update portions of the other virtual machines. In this case, the determination portion 146 determines that the safety integrity of the first virtual machine 140 is equal to the safety integrity of the virtual machine to be updated, based on the response signal from the update portion 143.

According to the example of the present embodiment, the safety integrity (ASIL-B) of the first virtual machine 140 is higher than the safety integrity (ASIL-A) of the second virtual machine 150 and the safety integrity (QM) of the fourth virtual machine 230. Therefore, the determination portion 146 determines to transfer the update file to the second virtual machine 150 and the fourth virtual machine 230.

Meanwhile, the safety integrity (ASIL-B) of the first virtual machine 140 is lower than the safety integrity (ASIL-C) of the third virtual machine 160. Therefore, the determination portion 146 determines not to transfer the update file to the third virtual machine 160.

The update instruction portion 148 instructs the second virtual machine 150 and the fourth virtual machine 230 to update the software of the virtual machine by using the update file transferred by the transfer portion 147. The update instruction portion 148 instructs the first virtual machine 140 and the third virtual machine 160 to access the ASIL-B storage area of the real storage 130 and update the software of the virtual machine by using the update file stored in the real storage 130.

(3) Configuration of the Second Virtual Machine 150

The virtual storage 152 for the second virtual machine 150 stores update files transferred by the transfer portion 147.

When receiving the update instruction from the update instruction portion 148, the update portion 151 of the second virtual machine 150 updates the software of the second virtual machine 150 by using the update file stored in the virtual storage 152.

The virtual storage 152 is a virtualized storage area corresponding to the storage area that is included in the real storage 130 and is assigned ASIL-A corresponding to the safety integrity of the second virtual machine 150.

(4) Configuration of the Third Virtual Machine 160

The update portion 161 included in the third virtual machine 160 accesses the ASIL-B storage area of the real storage 130, references the update file stored in the real storage 130 and uses the update file to update the software of the third virtual machine 160.

(5) Configuration of the Fourth Virtual Machine 230

The real storage 220 or the virtual storage 232 for the fourth virtual machine 230 stores the update file transferred by the transfer portion 147. The update file may be stored in the real storage 220 or the virtual storage 232. When receiving an update instruction from the update instruction portion 148, the update portion 231 of the fourth virtual machine 230 updates the software of the fourth virtual machine 230 by using the update file stored in real storage 220 or the virtual storage 232.

(6) Operations of the Virtual Machines Included in the Electronic Control System 1 and the ECUs 10 and 20

Figure 7:
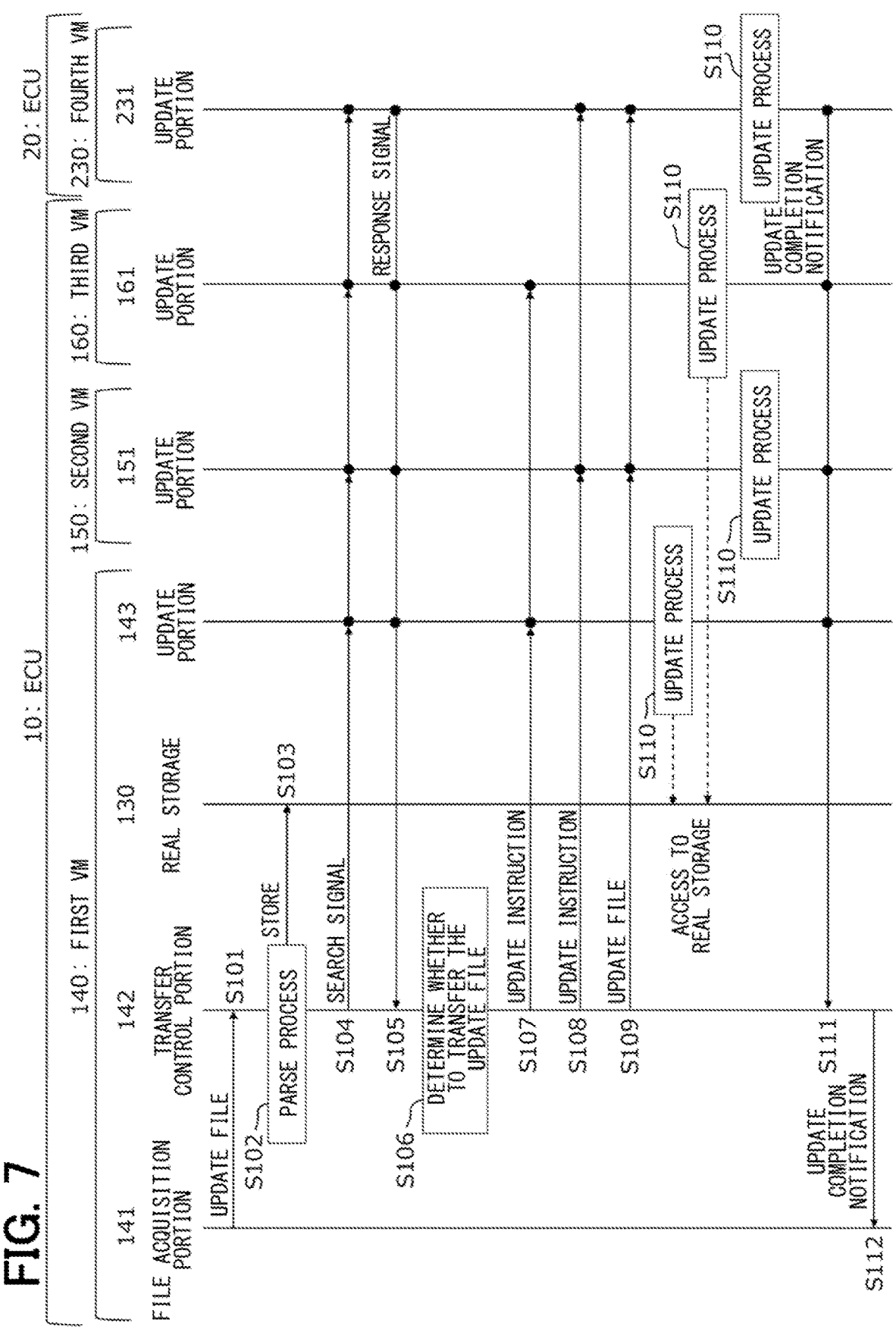
FIG. 7 is a diagram illustrating operations of the electronic control system as a whole according to the second embodiment.

FIG. 7 illustrates operations of the electronic control system 1 as a whole according to the present embodiment. Operations of the transfer control portion 142 and the update portion of the first virtual machine 140 according to the present embodiment are equal to those illustrated in FIGS. 3 and 4 according to the first embodiment. The description below references FIGS. 3 and 4.

The processes at S101 to S112 illustrated in FIG. 7 are equal to those of the electronic control system 1 according to the first embodiment illustrated in FIG. 2. However, the present embodiment at S106 differs from the first embodiment in the determination method concerning whether the determination portion 146 of the first virtual machine 140 transfers the update file to the virtual machine to be updated. At S106 of the present embodiment, the determination portion 146 determines whether to transfer the update file to the virtual machine to be updated, based on the safety integrity of the first virtual machine 140 and the safety integrity of the virtual machine to be updated. According to the present embodiment as above, the safety integrity of the first virtual machine 140 is higher than the safety integrities of the second virtual machine 150 and the fourth virtual machine 230. Therefore, the determination portion 146 determines to transfer the update file to the second virtual machine 150 and the fourth virtual machine 230. The safety integrity of the first virtual machine 140 is lower than the safety integrity of the third virtual machine 160. Therefore, the determination portion 146 determines not to transfer the update file to the third virtual machine 160.

The update instruction portion 148 of the transfer control portion 142 instructs the update portion 143 of the first virtual machine 140 and the update portion 161 of the third virtual machine 160 to update the software of the virtual machines by accessing the ASIL-B storage area of the real storage 130 (FIG. 7 and FIG. 3: S107).

The update instruction portion 148 further instructs the update portion 151 of the second virtual machine 150 and the update portion 231 of the fourth virtual machine 230 to update the software of the virtual machines by using the update file transferred by the transfer portion 147 (FIG. 7 and FIG. 3: S108).

The transfer portion 147 of the transfer control portion 142 transfers the update file to the second virtual machine 150 and the fourth virtual machine 230 (FIG. 7 and FIG. 3: S109).

The update portion 143 of the first virtual machine 140 receives the update instruction transmitted from the update instruction portion 148 at S107 (S203). This update instruction specifies access to the real storage (S204: Yes). Then, the update portion 143 accesses the ASIL-B storage area of the real storage 130 and updates the first virtual machine 140 by using the update file stored in the real storage 130 (FIG. 7 and FIG. 4: S110).

Similarly, the update portion 161 of the third virtual machine 160 receives the update instruction transmitted from the update instruction portion 148 at S107 (S203, S204: Yes). Then, the update portion 161 accesses the ASIL-B storage area of the real storage 130 and updates the third virtual machine 160 by using the update file stored in the real storage 130 (FIG. 7 and FIG. 4: S110).

The update portion 151 of the second virtual machine 150 receives the update instruction transmitted from the update instruction portion 148 at S108 (S203). This update instruction does not specify access to the real storage (S204: No). Then, the update portion 151 receives the update file transferred from the transfer portion 147 (S205). The update portion 151 updates the second virtual machine 150 by using the update file transferred from the transfer portion 147 based on the update instruction (FIG. 7 and FIG. 4: S110).

Similarly, the update portion 231 of the fourth virtual machine 230 receives the update instruction transmitted from the update instruction portion 148 at S108 (S203, S204: No) and receives the update file transferred from the transfer portion 147 (S205). Then, the update portion 231 updates the fourth virtual machine 230 by using the update file transferred from the transfer portion 147 based on the update instruction (FIG. 7 and FIG. 4: S110).

(7) Interim Overview

According to the above-described configuration, the virtual machine controlling the transfer of the update file to update the software of virtual machines transfers the update file only to the virtual machine that is given the safety integrity higher than the safety integrity of the virtual machine. No update file is transferred to a virtual machine given the safety integrity lower than or equal to that of the virtual machine. This makes it possible to omit the process of transferring the update files to some virtual machines. It is possible to reduce loads on the transfer process and shorten the time required to update the software of the virtual machines.

(8) First Modification of the Second Embodiment

According to the second embodiment described above, the update file is transferred only when the safety integrity of the first virtual machine 140 is higher than the safety integrity of the virtual machine to be updated. However, the update file may be transferred only when the safety integrity of the first virtual machine 140 differs from the safety integrity of the virtual machine to be updated.

FIG. 8 illustrates how the determination portion 146 according to the first modification determines whether to transfer the update file, based on safety integrity A of the first virtual machine 140 and safety integrity B of the virtual machine to be updated.

According to the example illustrated in FIG. 8, the determination portion 146 determines to transfer the update file to the virtual machine to be updated when safety integrity A of the first virtual machine 140 differs from safety integrity B of the virtual machine to be updated. Meanwhile, the determination portion 146 determines not to transfer the update file to the virtual machine to be updated when safety integrity A of the first virtual machine 140 is equal to safety integrity B of the virtual machine to be updated.

Similar to the second embodiment described above, suppose the first virtual machine 140 is given the safety integrity of ASIL-B, the second virtual machine 150 is given the safety integrity of ASIL-A, the third virtual machine is given the safety integrity of ASIL-C, and the fourth virtual machine is given the safety integrity of QM. Then, the safety integrity of the first virtual machine 140 differs from any of the safety integrities given to the second to fourth virtual machines. Therefore, the determination portion 146 determines to transfer the update file to all the second to fourth virtual machines. The determination portion 146 determines not to transfer the update file only to the first virtual machine itself.

The present modification enables only the virtual machine targeted at the update and given the same safety integrity to access the storage area of the real storage used by the virtual machine that controls the transfer of update files. It is possible to ensure real storage security by restricting access from virtual machines assigned with different safety integrities.

(9) Second Modification of the Second Embodiment

The first and second embodiments have been described as separate embodiments. The present modification applies the features of the first embodiment to the second embodiment.

The determination portion 146 according to the present modification determines whether to transfer the update file to the virtual machine to be updated, based on whether the hypervisor 110 managing the first virtual machine 140 is the same as the hypervisor managing the virtual machine to be updated and based on the safety integrity of the first virtual machine 140 and the safety integrity of the virtual machine to be updated.

For example, the determination portion 146 determines to transfer the update file to the virtual machine to be updated when the hypervisor 110 managing the first virtual machine 140 differs from the hypervisor managing the virtual machine to be updated and the safety integrity of the first virtual machine 140 is higher than the safety integrity of the virtual machine to be updated.

Alternatively, the determination portion 146 may determine whether to transfer the update file to the virtual machines by selecting either the determination method described in the first embodiment or the determination method described in the second embodiment.

4. Modification of the Electronic Control Unit and the Electronic Control System The description below explains a modified configuration of the electronic control unit and the electronic control system common to the first and second embodiments.

According to the above-described examples, the ECU 10 is AP-based and the ECU 20 is CP-based. However, each virtual machine built in the ECU may use AP and CP platforms.

FIG. 9 is a diagram illustrating each virtual machine using a specific platform (PF). FIG. 9 omits the description of the functions provided by the transfer control portion 142. Similar to FIG. 1, the transfer control portion 142 implements the file separation portion 145, the determination portion 146, the transfer portion 147, and the update instruction portion 148.

In FIG. 9, the first virtual machine 140 includes a first PF 1401. The second virtual machine 150 includes a second PF 1501. The third virtual machine 160 includes a third PF 1601. The fourth virtual machine 230 includes a fourth PF 2301. FIG. 9 also illustrates applications (1402, 1502, 1602, and 2302) running on the PFs for the virtual machines.

In addition to AP and CP, various types of PFs are available as the first through fourth PFs (1401, 1501, 1601, 2301) that can be used as needed. For example, the first PF 1401 may use AP. The second PF 1501 may use CP. The third PF 1601 may use PF other than AP and CP. One ECU may include multiple virtual machines using different PFs.

The single ECU can integrate multiple functions by mixing multiple virtual machines using different PFs in one ECU. Consequently, it is possible to reduce the total number of ECUs.

According to this configuration, the OS of the virtual machine may be provided between the hypervisor and the PF, integrated with the hypervisor, or included in the PF, for example.

The update portion of each virtual machine updates the software of the virtual machine. According to the configuration illustrated in FIG. 9, however, the update portion may update the PF or the application running on the PF as a software update for the virtual machine. For example, the update portion 143 updates the first PF 1401 or the first application 1402.

As illustrated in FIG. 9, the file acquisition portion 141 is included in the first application 1402. The transfer control portion 142 and the update portion 143 are included in the first PF 1041. However, the software contained in the first PF 1401 may implement all or part of the functions of the file acquisition portion 141. Alternatively, the first application 1402 may implement all or part of the functions of the transfer control portion 142 and the update portion 143. Similarly, the second through fourth applications (1502, 1602, 2302) may implement all or part of the functions of the update portions (151, 161, 231).

FIG. 9 also illustrates that the real storage 130 of the ECU 10 includes three storage areas, namely, a shared storage area 131, a software storage area 132, and a transferred file storage area 133.

The shared storage area 131 stores the update file that is acquired by the file acquisition portion 141 and is parsed by the file separation portion 145. The software storage area 132 stores such software configuring the virtual machine as the first through third PFs 1401, 1501, and 1601, and the first through third applications 1402, 1502, and 1602. The transferred file storage area 133 stores the update file transferred from the transfer portion 147. The virtual storages are built in the virtual machines by virtualizing the transferred file storage area 133.

According to the present modification, the update portion may be instructed to update the software of the virtual machine by using the update file stored in the real storage 130. In this case, the update portion accesses the shared storage area 131 and uses the update file stored in the shared storage area 131 to update the software of the virtual machine, namely, the software stored in the software storage area 132. Meanwhile, the update portion may be instructed to update the software of the virtual machine by using the update file transferred by the transfer portion 147. In this case, the update portion updates the software stored in the software storage area 132 by using the update file that is transferred from the transfer portion 147 and is stored in the transferred file storage area 133.

Like the real storage 130, the real storage 220 of the ECU 20 includes the software storage area 222 and the transferred file storage area 223. However, the ECU 20 need not store the update file acquired by the file acquisition portion. Therefore, the real storage 220 does not include a storage area comparable to the shared storage area 131. Like the software storage area 132 and the transferred file storage area 133, the software storage area 222 and the transferred file storage area 223 store the software configuring the virtual machine and the update file transferred by the transfer portion 147, respectively.

FIG. 9 illustrates that the real storage 130 includes all of the shared storage area 131, the software storage area 132, and the transferred file storage area 133. However, the real storage 130 may use different storages. For example, the software storage area 132 according to the present modification is non-volatile memory. However, the shared storage area 131 and the transferred file storage area 133 may be non-volatile memory or volatile memory. Therefore, the shared storage area 131 and the transferred file storage area 133 may be provided for the storage areas of the real storage 130 as volatile memory. The software storage area 132 may be provided for the storage area of the real storage 130 as non-volatile memory.

5. Application to the Domain Architecture

The description below explains an example configuration where the electronic control system 1 according to the first and second embodiments is applied to a domain architecture. The domain architecture classifies multiple ECUs into groups called domains according to the functions, roles, or network connections. In addition, each domain is provided with a domain controller ECU (DC-ECU) that manages and controls multiple ECUs belonging to the same domain. The domain architecture can organize and integrate ECUs according to functions and networks, enabling a system composed of many ECUs such as an in-vehicle system to not only facilitate operations of updating ECUs in the future but also suppress the total number of increasing ECUs.

(1) Overview of the Domain Architecture

Figure 10:
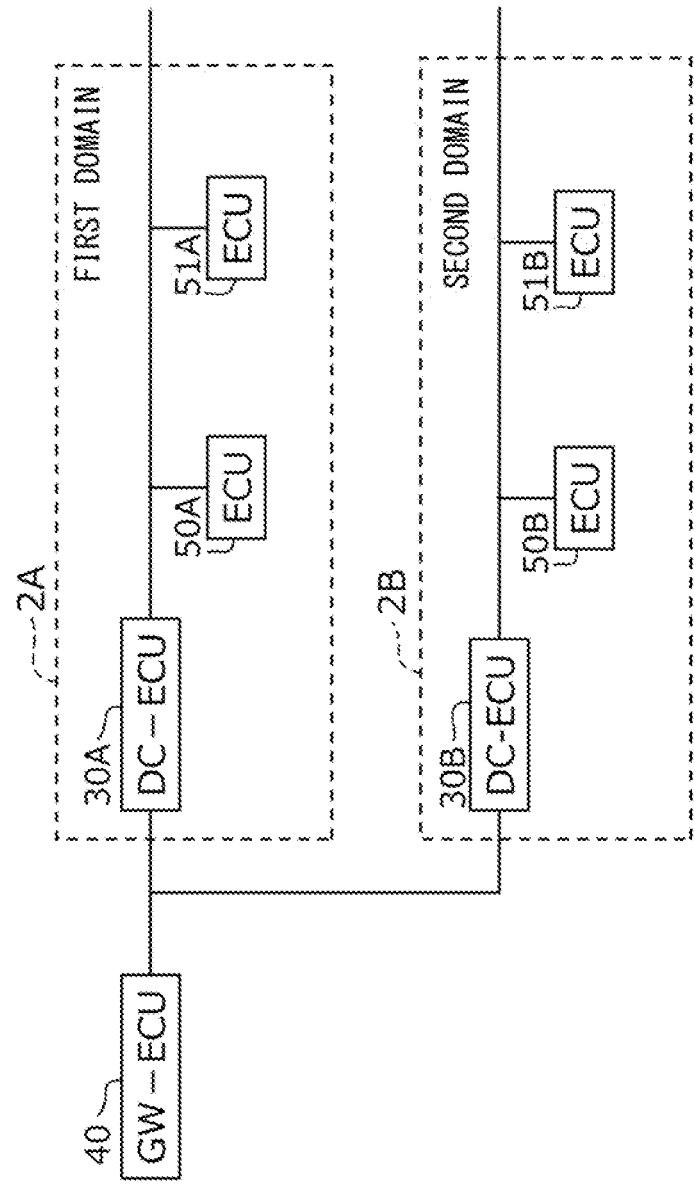
FIG. 10 is a diagram illustrating a domain architecture to which the electronic control system according to the first and second embodiments is applied.

FIG. 10 is a simplified diagram illustrating the domain architecture. The domain architecture illustrated in FIG. 10 includes DC-ECUs 30A and 30B, a gateway ECU (GW-ECU) 40, and ECUs 50A, 51A, 50B, and 51B.

The domain architecture illustrated in FIG. 10 includes two domains. A first domain 2A includes DC-ECU 30A and ECUs 50A and 51A. A second domain 2B includes DC-ECU 30B and ECUs 50B and 51B. As above, domains are categorized according to ECU functions and networks. For example, the in-vehicle system includes a domain to control a vehicle drive system, a domain to control automatic operations, and a domain to control entertainment devices such as in-vehicle TVs and in-vehicle computers.

The DC-ECU 30A controls the ECUs 50A and 51A belonging to the first domain 2A. The DC-ECU 30B controls the ECUs 50B and 51B belonging to the second domain 26. When the first domain 2A controls automatic operations, for example, the DC-ECU 30A controls a camera ECU, a radar ECU, a lidar ECU, a locator ECU, or the ECUs 50A and 51A including various automatic operation applications. The DC-ECU 30A also includes a sensor fusion application that integrates the sensor information output from the ECUs 50A and 51A. Outputs from the sensor fusion application may be supplied to the ECU 50A and 51A.

The GW-ECU 40 functions as a gateway device on the in-vehicle network. The GW-ECU 40 is connected to multiple buses and is connected to other ECUs via each bus. The GW-ECU 40 relays communication between domains, for example. The GW-ECU 40 also functions as a gateway between the outside of the vehicle and the domain.

In FIG. 10, the DC-ECU 30A, the GW-ECU 40, the ECU 50A, and the 51A are illustrated as different ECUs. The above-described ECU functions may be integrated into another ECU. For example, the functions of the ECUs 50A and 51A may be partly integrated into the DC-ECU 30A. In this case, the functions integrated into the DC-ECU 30A may be implemented by the virtual machine mounted on the DC-ECU 30A.

(2) Examples of Applying the Domain Architecture to the Electronic Control System 1

The above-described embodiments have described the electronic control system 1 including the ECU 10 and the ECU 20. When the domain architecture in FIG. 10 is applied to the electronic control system 1, the ECU 10 to acquire the update file and transfer the update file to other virtual machines is favorably configured as the DC-ECUs 30A and 30B (comparable to "domain controller") in FIG. 10. In this case, the DC-ECUs 30A and 30B based on the domain architecture each issue the update instructions to the ECUs belonging to the same domain and also transfer the update files as needed. Therefore, the DC-ECUs 30A and 30B do not transfer update instructions or update files to virtual machines of ECUs belonging to different domains.

For example, the ECU 10 configured as the DC-ECU 30A does not transfer update instructions and update files to the ECUs (DC-ECU 30B, ECUs 50B and 51B) included in the second domain 2B. The ECU permitted to access the real storage 130 of the ECU 10 must belong to the same domain, namely, the first domain 2A. Similarly, the ECU 10 configured as the DC-ECU 30B does not transfer update instructions and update files to ECUs included in the first domain 2A.

The electronic control system 1 based on the domain architecture can limit communication between ECUs to the same or related domains. It is possible to suppress the traffic of the entire in-vehicle network and consequently improve the responsiveness in the in-vehicle network.

Moreover, access from ECUs belonging to different domains is restricted. Even if an ECU belonging to one domain is under attack from the outside, for example, it is possible to prevent unauthorized access to different domains.

As another example, the ECU 10 may be configured as the GW-ECU 40 (comparable to "gateway device") in FIG. 10. In this case, the ECU 20 is configured as DC-ECUs 30A and 30B or ECUs 50A, 50B, 51A, and 51B. Only the real storage 130 of the GW-ECU 40 is accessed from the ECUs belonging to various domains. Similar to the case of configuring the ECU 10 as the DC-ECU, even if an ECU belonging to one domain is under attack from the outside, it is possible to prevent unauthorized access to different domains.

6. General Overview

There have been described the features of the electronic control unit and the electronic control system including the electronic control unit according to the embodiments of the present disclosure.

The technical terms used in the embodiments are examples and therefore may be replaced with synonymous terms or terms including synonymous functions.

The block diagrams used for the description of the embodiment serve as classification and arrangement of the configuration of the device according to the functions. The block representing each function is implemented by any combination of hardware or software. The block diagram illustrates the functions and therefore can be understood as the disclosure of the invention of the method and the invention of the program implementing the method.

Each embodiment describes the processes, flows, and functional blocks that can be considered as a method. The sequence thereof may be interchanged as long as there does not exist a restriction that forces a certain step to use the result of the preceding step, for example.

In the embodiments and the claims, the terms such as first, second, and so on including Nth (where N is an integer) are used to distinguish the same type of two or more configurations or methods and do not limit the sequence, superiority, or inferiority.

The electronic control unit according to each embodiment is assumed to configure an in-vehicle device mounted on vehicles. However, the electronic control unit according to the present disclosure is applied to any electronic control system unless specifically limited in the claims.

The apparatus according to the present disclosure is exemplified in the following forms.

The form of components includes semiconductor elements, electronic circuits, modules, and microcomputers.

The form of semi-finished products includes electronic control units (ECUs) and system boards.

The form of finished products includes mobile phones, smartphones, tablets, personal computers (PCs), workstations, and servers.

Other examples include devices to support communication functions such as video cameras, still cameras, and car navigation systems.

Each device may additionally include necessary functions such as an antenna and a communication interface.

The present disclosure can be implemented as not only dedicated hardware having the configurations and functions described in each embodiment, but also a combination of a program recorded on a recording medium such as memory or a hard disk to embody the disclosure; and general-purpose hardware including a dedicated or general-purpose CPU and memory capable of executing the program.

A program is stored in a non-transitory tangible storage medium of dedicated or general-purpose hardware as an external storage device such as hard disk, USB memory, or CD/BD or in an internal storage device such as RAM or ROM. The program can be also supplied to dedicated or general-purpose hardware through the use of recording media or via a communication line from a server without the use of recording media. This makes it possible to upgrade the program and always provide the latest features.

The electronic control unit according to the present disclosure has been described as an in-vehicle electronic control unit mainly mounted on automobiles but can apply to all moving bodies such as motorcycles, ships, railroads, and aircraft. The electronic control unit can apply to not only moving bodies but also all products equipped with microcomputers.

What is claimed is:

1. An electronic control unit including a virtual machine managed by a hypervisor, the electronic control unit comprising:
    a file acquisition portion that is configured to acquire a file to update software; and
    a storage portion that is configured to store the file, wherein
    the virtual machine is a first virtual machine including:
        a determination portion that is configured to determine whether a first hypervisor that is configured to manage the first virtual machine and a second hypervisor that is configured to manage a second virtual machine connected to the first virtual machine are the same; and
        a transfer portion that is configured to transfer the file to the second virtual machine when the determination portion determines that the first hypervisor and the second hypervisor are different from each other.

2. The electronic control unit according to claim 1, wherein
    the first virtual machine further includes an update portion that is configured to update software of the first virtual machine by accessing the storage portion and using the file stored in the storage portion.

3. The electronic control unit according to claim 1, wherein
    the first virtual machine further includes an update instruction portion that is configured to instruct the second virtual machine to perform an update,
    the update instruction portion is configured to instruct the second virtual machine to:
        perform a software update by using the file transferred by the transfer portion when the determination portion determines that the first hypervisor and the second hypervisor are different from each other; and
        perform a software update by accessing the storage portion and using the file stored in the storage portion when the determination portion determines that the first hypervisor and the second hypervisor are the same.

4. The electronic control unit according to claim 1, further comprising:
    a plurality of virtual machines as the virtual machine, wherein
    the plurality of virtual machines are managed by a single hypervisor, and
    the determination portion is configured to determine that the first hypervisor and the second hypervisor are the same when the second virtual machine is determined to be a virtual machine included in the electronic control unit.

5. The electronic control unit according to claim 1, wherein
    the first hypervisor and the second hypervisor are the same, and
    the storage portion is a storage portion managed by the hypervisor.

6. The electronic control unit according to claim 5, wherein
    the first virtual machine and the second virtual machine are allowed to access the storage portion only when the file stored in the storage portion is used for update.

7. The electronic control unit according to claim 1, wherein
    the storage portion is a storage portion provided by the first virtual machine.

8. The electronic control unit according to claim 1, wherein
    the determination portion is further configured to determine whether to transfer the file to the second virtual machine based on first safety integrity indicating a safety level of the first virtual machine and second safety integrity indicating a safety level of the second virtual machine.

9. The electronic control unit according to claim 1, wherein
    the first virtual machine includes a platform and an application operating on the platform.

10. The electronic control unit according to claim 9, further comprising:
    the second virtual machine, wherein
    the platform is a first platform, and
    the second virtual machine includes a second platform that is different from the first platform.

11. The electronic control unit according to claim 1, wherein
the electronic control unit is mounted in a moving body.

12. A software update method performed by an electronic control unit including a virtual machine managed by a hypervisor, the method comprising:
acquiring a file to update software;
storing the file in a storage portion;
determining whether a first hypervisor that is configured to manage a first virtual machine as the virtual machine and a second hypervisor that is configured to manage a second virtual machine connected to the first virtual machine are the same; and
transferring the file to the second virtual machine upon determining that the first hypervisor and the second hypervisor are different from each other.

13. A non-transitory storage medium storing instructions executable on an electronic control unit including a virtual machine managed by a hypervisor, the instructions, when executed by the electronic control unit, causing the electronic control unit to perform:
acquiring a file to update software;
storing the file in a storage portion;
determining whether a first hypervisor that is configured to manage a first virtual machine as the virtual machine and a second hypervisor that is configured to manage a second virtual machine connected to the first virtual machine are the same; and
transferring the file to the second virtual machine upon determining that the first hypervisor and the second hypervisor are different from each other.

14. An electronic control system, comprising:
a first electronic control unit having a first virtual machine that is managed by a first hypervisor; and
a second electronic control unit having a second virtual machine that is managed by a second hypervisor, wherein
the first electronic control unit includes:
 a file acquisition portion that is configured to acquire a file to update software; and
 a storage portion that is configured to store the file therein,
the first virtual machine includes:
 a determination portion that is configured to determine whether the first hypervisor and the second hypervisor are the same; and
 a transfer portion that is configured to transfer the file to the second virtual machine when the determination portion determines that the first hypervisor and the second hypervisor are different from each other, and
the second virtual machine includes an update portion that is configured to update the second virtual machine by:
 accessing the storage portion and using the file stored in the storage portion; or
 using the file transferred by the transfer portion.

15. The electronic control system according to claim 14, further comprising:
a domain including the first electronic control unit and the second electronic control unit, wherein
the first electronic control unit is a domain controller that is configured to control an electronic control unit included in the domain.

16. The electronic control system according to claim 14, further comprising
a domain including the second electronic control unit, wherein
the first electronic control unit is a gateway device connected to a plurality of buses,
the second electronic control unit is connected to the gateway device via one of the buses, and
the second electronic control unit is:
 a domain controller that is configured to control an electronic control unit included in the domain; or
 the electronic control unit controlled by the domain controller.

* * * * *